(12) United States Patent
Kuntz (10) Patent No.: US 12,179,438 B2
(45) Date of Patent: Dec. 31, 2024

(54) SEMI-FINISHED PRODUCT AND METHOD FOR PRODUCING A STRUCTURAL COMPONENT

(71) Applicant: Premium Aerotec GmbH, Augsburg (DE)

(72) Inventor: Julian Kuntz, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 615 days.

(21) Appl. No.: 17/282,266

(22) PCT Filed: Sep. 26, 2019

(86) PCT No.: PCT/EP2019/076079
§ 371 (c)(1),
(2) Date: Apr. 1, 2021

(87) PCT Pub. No.: WO2020/069978
PCT Pub. Date: Apr. 9, 2020

(65) Prior Publication Data
US 2021/0370620 A1 Dec. 2, 2021

(30) Foreign Application Priority Data
Oct. 4, 2018 (DE) .......................... 102018217018.5

(51) Int. Cl.
*B29C 70/22* (2006.01)
*B29C 35/08* (2006.01)
(Continued)

(52) U.S. Cl.
CPC ........ *B29C 70/222* (2013.01); *B29C 35/0805* (2013.01); *B29C 70/465* (2013.01);
(Continued)

(58) Field of Classification Search
CPC ........ D04H 3/14; D04H 3/04; B29C 35/0805; B29C 70/465; B29C 70/42; B29C 70/222;
(Continued)

(56) References Cited

U.S. PATENT DOCUMENTS 5,591,369 A   1/1997  Matsen et al.
5,633,074 A * 5/1997  Muroi ................... B29C 70/222
                                                      428/36.1
(Continued)

FOREIGN PATENT DOCUMENTS

CA    2898021 A1    8/2014
DE   19910201 A1    9/2000
(Continued)

OTHER PUBLICATIONS

Search Report from Office Action for German Application No. 10 2018 217 018.5 issued May 29, 2019; 1 page.
(Continued)

*Primary Examiner* — Monica A Huson
(74) *Attorney, Agent, or Firm* — Lerner David LLP (57) ABSTRACT

A semi-finished product for the manufacture of a structural component has a plurality of prepreg tapes, each having unidirectionally arranged reinforcing fibers embedded in a thermoplastic matrix material, and with a plurality of connecting strands containing a thermoplastic material. The prepreg tapes and the connecting strands are either joined to form a textile sheet structure or the prepreg tapes are arranged to form a multiaxial fabric, individual layers of the fabric being joined by the connecting strands. Further, a method for manufacturing a curved structural component from such a semi-finished product is described.

17 Claims, 6 Drawing Sheets

(51) Int. Cl.
*B29C 70/46* (2006.01)
*B32B 5/02* (2006.01)
*B32B 5/26* (2006.01)
*B32B 7/09* (2019.01)
*C08J 5/24* (2006.01)
*D03D 15/46* (2021.01)
*D03D 15/47* (2021.01)
*B29K 101/12* (2006.01)
*B29K 105/08* (2006.01)

(52) U.S. Cl.
CPC ............... *B32B 5/02* (2013.01); *B32B 5/26* (2013.01); *B32B 7/09* (2019.01); *C08J 5/24* (2013.01); *D03D 15/46* (2021.01); *D03D 15/47* (2021.01); *B29C 2035/0811* (2013.01); *B29K 2101/12* (2013.01); *B29K 2105/0845* (2013.01); *B29K 2105/0881* (2013.01); *B32B 2260/023* (2013.01); *B32B 2260/046* (2013.01); *B32B 2305/076* (2013.01); *B32B 2605/18* (2013.01); *C08J 2300/22* (2013.01); *D10B 2401/041* (2013.01); *D10B 2505/02* (2013.01)

(58) Field of Classification Search
CPC ..... B29C 2035/0811; B32B 7/09; B32B 5/26; B32B 5/02; B32B 2605/18; B32B 2305/076; B32B 2262/02; B32B 2262/10; B32B 2262/103; B32B 2262/101; B32B 2262/105; B32B 2260/046; B32B 2260/023; B32B 2262/106; C08J 5/04; C08J 5/24; C08J 2300/22; D03D 15/46; D03D 15/47; D03D 1/00; D03D 15/587; B29K 2105/0881; B29K 2995/0046; B29K 2105/0845; B29K 2101/12; D10B 2505/02; D10B 2401/041

See application file for complete search history.

(56) References Cited

U.S. PATENT DOCUMENTS

| | | | |
|---|---|---|---|
| 5,808,281 A | 9/1998 | Matsen et al. | |
| 5,939,007 A | 8/1999 | Iszczyszyn et al. | |
| 5,952,067 A * | 9/1999 | Head | D04C 1/06 87/9 |
| 2002/0034624 A1 | 3/2002 | Harpell et al. | |
| 2005/0035115 A1 | 2/2005 | Anderson et al. | |
| 2008/0240954 A1* | 10/2008 | Morozumi | F04C 18/3564 418/13 |
| 2008/0260954 A1 | 10/2008 | Paton et al. | |
| 2011/0006460 A1 | 1/2011 | Vander Wel et al. | |
| 2011/0156305 A1 | 6/2011 | Lonsdorfer et al. | |
| 2014/0050813 A1 | 2/2014 | Balas | |
| 2014/0131917 A1 | 5/2014 | Naumann et al. | |
| 2014/0216642 A1 | 8/2014 | Childress et al. | |
| 2017/0240714 A1 | 8/2017 | Ahmed et al. | |
| 2017/0274603 A1 | 9/2017 | Iwata et al. | |
| 2022/0161508 A1* | 5/2022 | Kuntz | B29C 43/3642 |

FOREIGN PATENT DOCUMENTS

| | | |
|---|---|---|
| DE | 102010050740 A1 | 5/2012 |
| DE | 102018217018 A1 | 4/2020 |
| EP | 1321282 A1 | 6/2003 |
| EP | 3251821 A1 | 12/2017 |
| TR | 201618336 A2 | 6/2018 |
| WO | 2015145407 A1 | 10/2015 |
| WO | 2020069978 A2 | 4/2020 |

OTHER PUBLICATIONS

International Search Report for Application No. PCT/EP2019/076079, dated Mar. 30, 2020, 6 pages.

* cited by examiner

SEMI-FINISHED PRODUCT AND METHOD FOR PRODUCING A STRUCTURAL COMPONENT

CROSS-REFERENCE TO RELATED APPLICATIONS

The present application is a national phase entry under 35 U.S.C. § 371 of International Application No. PCT/EP2019/076079 filed Sep. 26, 2019, published in German, which claims priority from German Application No. 102018217018.5 filed Oct. 4, 2018, the disclosures of which are incorporated herein by reference.

The present invention relates to a semi-finished product and method for manufacturing a structural component, in particular a structural component, which has a curved or double-bent shape or form.

In the field of aircraft and spacecraft construction in particular, structural components made of fibre composite material are used which have a curved, dome-shaped or otherwise spherical shape in at least two directions. Such components are used in aircraft construction, e.g. as pressure bulkheads or fuselage shells.

For the production of such multi-curved structural components, typically a multitude of mat-shaped semi-finished fiber products are first stacked to form a laminate or layered structure. The semi-finished fiber products may be in the form of fiber mats pre-impregnated with a matrix material. The laminate structure formed is then shaped and the matrix material is cured.

US 2005/0035115 A1 describes a process for the production of fiber composite components, wherein a layered structure, which has reinforcing fiber layers embedded in thermoplastic matrix material, is received between heating mats and inductively heated to a forming temperature. In a closed cavity of a compression mold, the layered structure is formed together with the heating mats by means of a pressurized fluid. A similar method is described in U.S. Pat. No. 5,591,369 A.

DE 10 2010 050 740 A1 describes a method of manufacturing a structural component, wherein a plurality of semi-finished layers of a fiber-reinforced thermoplastic plastics material are stacked and selectively joined together at points in order to fix a position of the semi-finished layers relative to one another. The type of connection is intended to prevent the formation of folds during subsequent press forming.

It is an object of the present invention to provide a semi-finished product and a method for manufacturing a structural component from a fiber-reinforced thermoplastic material, each of which further reduces wrinkle formation during forming.

This task is solved by the objects of the independent claims, respectively.

According to a first aspect of the invention, a semi-finished product is provided for manufacturing a structural component. The semi-finished product comprises a plurality of prepreg tapes extending along each other, each having unidirectionally arranged reinforcing fibers embedded in a thermoplastic matrix material, and a plurality of connecting strands comprising a thermoplastic plastic material. The connecting strands and the prepreg tapes are joined together to form a textile sheet structure in which each of the connecting strands crosses a plurality of the prepreg tapes. The connecting strands and the prepreg tapes are joined together along a respective connecting line in a first end region of the textile sheet structure and in a second end region of the textile sheet structure opposite to the first end region.

An idea underlying the invention is to provide a semi-finished product in the form of a textile sheet structure formed from prepreg tapes with unidirectional fibers and connecting strands comprising a thermoplastic material. In particular, the thermoplastic material of the connecting strands may be the same thermoplastic material as the matrix material contained in the prepreg tapes or at least have a similar composition. The textile structure, i.e., a structure of intersecting strands, offers the advantage that the semi-finished product has anisotropic deformation properties. In particular, the textile structure allows the prepreg tapes to slide along each other, which prevents wrinkling during deformation. The formation of wrinkles is further prevented by the fact that a material joint of the strands, i.e., a material joint between prepreg tapes and thermoplastic connecting strands, is only provided along connecting lines located opposite each other, whereby the prepreg tapes and the connecting strands can slide along each other or are not connected at the other crossing points. The unidirectional thermoplastic prepreg tapes are elongated, single-ply tape material in which continuous reinforcing fibers extending in only one direction are embedded in a thermoplastic matrix material. Such prepreg tapes offer the advantage that they are easily deformable but less susceptible to the formation of ondulations. In contrast to semi-finished products consisting purely of woven reinforcing fibers, the semi-finished product according to the invention no longer requires subsequent infiltration with matrix material in order to produce a structural component from the semi-finished product.

According to another aspect of the invention, a semi-finished product for manufacturing a structural component is provided. The semi-finished product comprises a plurality of prepreg tapes each having unidirectionally arranged reinforcing fibers embedded in a thermoplastic matrix material. Optionally, a plurality of connecting strands comprising a thermoplastic plastic material are further provided. The prepreg tapes are arranged to form a multiaxial fabric comprising a plurality of superimposed layers of prepreg tapes, wherein the prepreg tapes within a layer run parallel to one another, and wherein the layers are joined relative to one another at individual points, in particular sewn, knitted, woven, welded or joined by another textile process, preferably by means of the connecting strands.

According to this aspect of the invention, a multilayer semi-finished product is provided, wherein the individual layers are formed from parallel prepreg tapes and the individual layers are connected only at points by the connecting strands. For example, joints may be provided along parallel lines. Due to the merely punctual connection of the layers and the parallel extension of the prepreg tapes and thus of the reinforcing fibers within the individual layers, the individual layers can slide relative to each other and the fibers within the individual layers can slide relative to each other, thus preventing wrinkling. The advantages mentioned above for the use of prepreg tapes with thermoplastic material apply analogously to this aspect of the invention.

The semi-finished products described allow in particular an efficient deposition of flat semi-finished product layers. This means that it is no longer necessary to deposit and fix individual prepreg tapes to form a flat layer.

According to a further aspect of the invention, a method of manufacturing a structural component having a curved shape is provided. According to this method, a layered structure is first formed from a plurality of layers, the layers each comprising at least one semi-finished product formed as described above. The layers can optionally be thermoplastically joined, for example by welding, in particular ultrasonic welding, at a joining point which is located in the region of a vertex of the curved shape to be produced. Thus, a discrete, e.g., point-shaped, material joint of the layers of the layered structure is produced at a point at which no or only slight relative movements of the individual layers to one another occur during forming in order to produce the curved shape. In a further step, the layered structure is formed into the curved shape at a forming temperature that is lower than a melting point of the thermoplastic materials of the semi-finished product. After forming, the formed layered structure is heated to a temperature that is higher than the melting point of the thermoplastic materials of the semi-finished product, i.e., higher than the melting point of the thermoplastic matrix material of the prepreg tapes and higher than the melting point of the thermoplastic material of the connecting strands of the semi-finished product. Finally, the layered structure is consolidated by applying a compression pressure and cooled down again under this pressure to a solidification temperature that is lower than the melting point of the thermoplastic materials of the semi-finished product.

Consequently, another idea of the invention is to reduce wrinkling by forming the layered structure at a temperature that is lower than the melting point of the thermoplastic materials of the semi-finished product. Since the thermoplastic materials are still solid during forming, the layers of the layered structure do not yet stick together outside the optional joint, so that sliding of the layers against each other is still possible, especially if the layers also shear differently due to different fiber directions during the forming process. In this way, the individual prepreg tapes of a respective layer themselves and the individual layer can slide against each other, which prevents wrinkling of the reinforcing fibers. Due to the fixing of the layers or plies relative to each other in an area of the layered structure which contains an apex of the curved shape of the structural component after forming further facilitates sliding of the layers relative to each other in more deformed areas.

By reducing the formation of wrinkles, the mechanical strength of the components is improved. Due to the textile structure of prepreg tapes and connecting strands, which each have one, preferably the same, thermoplastic material, a large flat component can be produced in a very simple and quick manner after forming.

Advantageous embodiments and further designs result from the subclaims referring back to the independent claims in connection with the description.

In particular, the prepreg tapes may comprise a width between 3 mm and 15 mm. In particular, it can also be provided that a width is between 0.001 percent and 5 percent of a length of the prepreg tapes. In general, the prepreg tapes are thus narrow, which further improves the formability of the semi-finished product.

According to an embodiment of the semi-finished product, it is provided that the prepreg tapes extend in a first direction and the connecting strands extend in a second direction transverse to the first direction, and wherein an outermost first prepreg tape in relation to the second direction and an outermost second prepreg tape located opposite to the first prepreg tape are respectively joined with the connecting strands by way of a material joint to form the connecting lines. According to this embodiment, the connecting lines run along outermost prepreg tapes of the textile semi-finished product that are located opposite to each other. This prevents fraying or disintegration of the semi-finished product, while the sliding of the individual tapes relative to each other is impeded as little as possible.

According to a further embodiment of the semi-finished product, the prepreg tapes and the connecting strands are interwoven with each other. Accordingly, the prepreg tapes each run parallel to each other, e.g., in a first direction, and the connecting strands extend transversely to the prepreg tapes, e.g., in a second direction, and also run parallel to each other. For example, the prepreg tapes may be provided as warp strands and the connecting strands may be provided as weft strands, or vice versa. Optionally, the connecting strands and the prepreg tapes are woven in an atlas weave in which the weft strand passes under a warp strand and then across more than two warp strands. The formation of the textile sheet structure by weaving prepreg tapes and connecting strands in particular offers the advantage that the reinforcing fibers run approximately parallel to each other within the sheet structure. Furthermore, weaving can be easily automated.

According to a further embodiment, the prepreg tapes and the connecting strands are interwoven with each other.

According to a further embodiment of the semi-finished product, the connecting strands each comprise a first end region and a second end region opposite to the first end region, the first and second end regions each projecting beyond the connecting lines. Accordingly, the connecting strands form protrusions or a kind of tab which protrude over an edge or edge region of the sheet structure. These tabs can be used for coupling to other semi-finished products of the same or similar construction in a material joint, which facilitates the processing of the semi-finished product.

According to a further embodiment of the semi-finished product, the connecting strands are formed as foil tapes consisting of the thermoplastic material or as threads consisting of the thermoplastic material. Tapes, i.e., strands with flat, rectangular cross-sections, have a low cross-sectional thickness, so that a very thin semi-finished product can be realized. Threads, i.e., strands with several filaments twisted into an approximately circular cross-section, offer the advantage of greater mechanical strength.

Optionally, the connecting strands consist of thermoplastic plastic material, preferably the thermoplastic matrix material of the prepreg tapes. As a result, the connecting strands dissolve to a certain extent when the semi-finished product is heated to a temperature higher than the melting temperature of the thermoplastic materials and additionally improve the cohesion between the reinforcing fibers.

According to an embodiment of the method, the individual layers of the layered structure are each formed from several semi-finished products in which the connecting strands project beyond the connecting lines, as described above. In particular, at least the first end regions of the connecting strands of a first semi-finished product are thermoplastically joined to prepreg tapes of a respective further semi-finished product. Optionally, the second end regions of the connecting strands of the further semi-finished product can also be thermoplastically joined to prepreg tapes of the first semi-finished product. In this way, large flat layers can be produced in a simple manner. For the thermoplastic joint, a welding process such as ultrasonic welding can be used, for example.

According to a further embodiment of the method, it can be provided that the layered structure is formed in such a way that the prepreg tapes in different layers extend in different directions. For example, the layers are stacked in such a way that the prepreg tapes of two adjacent layers or plies extend in different directions. Thus, the reinforcing fibers in different layers also extend in different directions, which improves the mechanical strength of the structural component.

According to a further embodiment of the method, the layered structure is formed by sequential stacking of the layers on a flat deposition surface and the forming takes place in a further step, e.g., in a cavity of a forming tool, wherein the cavity is formed by a part of the forming tool with a contour surface corresponding to the curved shape of the structural component and a flat abutment member. Stacking on a flat surface offers the advantage that a large number of layers can be deposited quickly, with little risk of wrinkling. Forming takes place in a separate (press) forming step.

According to a further embodiment of the method, the layered structure is formed by sequential stacking of the layers on a curved deposition surface and thereby simultaneously forming into the curved shape, wherein a contour surface of a form part of a forming tool is formed by the deposition surface corresponding to the curved shape of the structural component, wherein the forming tool additionally comprises a flat abutment member for forming a cavity with the forming part. Thereby, each layer is deposited separately on a curved surface and thus at least partially already formed into the desired shape. This offers the advantage that the individual layers do not have to slide against each other for forming, or only to a small extent, which further reduces the risk of wrinkling.

Optionally, it can be provided that layers of the layered structure deposited on the curved contour surface of the form part are thermoplastically joined at further bonding points in addition to the optional bonding point located in the region of the apex. This fixes the layers in their position.

According to a further embodiment of the method, it is provided that the heating of the layered structure takes place in the cavity of the forming tool. If the layers have already been deposited on the form part, the cavity is first closed by the deposition part, thereby compacting the individual layers.

According to a further embodiment of the method, the form part of the forming tool is designed as a flatly extending first form plate, whereby the abutment member is designed as a flatly extending second form plate. The form part and the abutment member are thus each designed as flat, curved metal plates. Compared to solid presses, the form parts have a low heat capacity. Therefore the cavity can be heated up quickly and with little energy input.

The form may also be formed as a partially solid mold, e.g., with a surface portion forming the contour surface and with a base portion formed as a stiffening structure supporting the surface portion.

According to one embodiment, in order to apply the compression pressure, a magnetic field is generated by means of a magnet device, which is coupled into a magnetizable material associated with the first form plate and/or into a magnetizable material associated with the second form plate in such a way that the layered structure is subjected to the compression pressure by the form plates. In particular, a magnetic field directed transversely to the contour surface is generated. Accordingly, the compression pressure is generated by means of a magnetic force which can, for example, act directly on the form plates, e.g., if the first and/or the second form plate is formed from a magnetizable metal material and the magnetizable material is associated with the respective form plate in this way. Alternatively, the magnet device can also have magnetizable elements coupled to the form plates as magnetic material, which press the form plates together relative to each other by the effect of the magnetic field. Due to their flat extension, the form plates allow the formation of a magnetic field extending through the cavity in which the layered structure is located. On the one hand, this achieves a very even distribution of pressure. Furthermore, this offers the advantage that the form plates can be designed relatively thin, which reduces the tool costs. In particular, the force for compressing the form halves can act through the form halves and the component. This is particularly advantageous for large, flat components.

According to a further embodiment of the method, the forming tool is placed on a form half for heating and cooling or consolidation, whereby the compression pressure is applied by the forming tool during cooling. In particular, the form half can serve here as a kind of support for the forming tool, which is particularly advantageous when using form plates. Furthermore, the form half can also serve as a heat sink.

According to a further embodiment, it is provided that the forming tool for cooling or consolidation is arranged in a cavity formed by two form halves of a compression tool and the compression pressure is applied through the form halves. Accordingly, it is provided that the forming tool, in the cavity of which the layered structure is accommodated, is compressed between two form halves adapted to an outer contour of the forming tool. In this way, the final desired curved shape of the structural component can be produced very precisely. The pressing tool also serves as a heat sink for cooling the layered structure. Heating the layered composite in the cavity of the forming tool and cooling it in the cavity of a separate pressing tool accelerates the method and saves energy.

According to a further embodiment of the method, the heating of the layered structure is carried out by inductive heating of the form plates or by means of infrared radiation. Inductive heating, i.e., heating by generating alternating magnetic fields by means of an alternating electrical voltage, offers the advantage that the form plates themselves act as a heating device. This allows to realize efficient heating of the cavity. Infrared radiation can be generated advantageously with little constructional effort. Since the form plates have a low heat capacity, both heating by means of infrared radiation and inductive heating of the form plates are suitable for generating rapid temperature changes in the cavity, which accelerates both the heating and the cooling of the layered structure.

According to a further embodiment, it is provided that a vacuum is generated in the cavity of the forming tool. In particular during forming and/or for applying the compression pressure. By generating a vacuum in the cavity of the forming tool, air that may be present between or in the layers of the layered structure is extracted from the layered structure. This prevents pore formation in the structural component and thereby increases the mechanical strength of the structural component. Furthermore, the vacuum can be used at least partially to generate the compression pressure or the pressure for forming. This further accelerates the method.

As used herein, a "curved component" or "curved shape" is generally understood to mean a geometric body having at least a first surface and a second surface oriented opposite thereto, the first and second surfaces each being curved in at least two directions. In particular, this may include geometries that cannot be unwound onto a plane. For example, a curved body is understood herein to mean an at least partially dome-shaped, spherical, parabolic or bowl-shaped body.

A vertex of the curved shape of the component may be given, for example, by the centroid of one of the surfaces forming the curved shape of the body. In particular, the vertex may lie on an intersection of symmetry lines of the curved shape.

With regard to directional indications and axes, in particular to directional indications and axes relating to the course of physical structures, it is understood herein by a course of an axis, of a direction or of a structure "along" another axis, direction or structure that these, in particular the tangents resulting in a respective location of the structures, each run at an angle of less than or equal to 45 degrees, preferably less than 30 degrees and in particular preferably parallel to one another.

With respect to directional indications and axes, in particular to directional indications and axes relating to the course of physical structures, it is understood herein by a course of an axis, of a direction or of a structure "transversely" to another axis, direction or structure that these, in particular the tangents resulting in a respective location of the structures, each run at an angle of greater than or equal to 45 degrees, preferably greater than or equal to 60 degrees and in particular preferably perpendicular to one another.

Reinforcing fiber herein may generally be fibers that are thread-shaped or piecewise thread-shaped, such as carbon, glass, ceramic, aramid, boron, mineral, natural or plastic fibers or mixtures thereof.

A "melting point" or a "melting temperature" is understood herein in relation to a thermoplastic material as a temperature above which the material is in a flowable, viscous state. Above the melting temperature, a component made of thermoplastic material may be bonded by way of a material joint, in particular fused, with another component made of thermoplastic material, which is also above the melting temperature.

The invention is explained below with reference to the figures in the drawings. From the figures show.

In the figures, the same reference signs denote identical or functionally identical components, unless otherwise stated.

Figure 1:
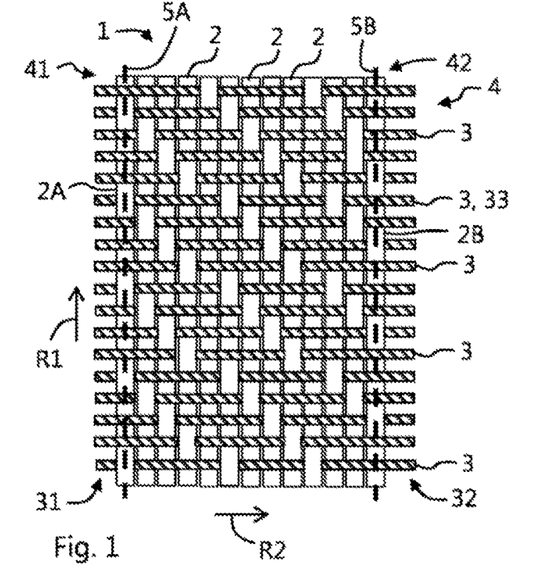
FIG. 1 a top view of a semi-finished product according to an exemplary embodiment of the present invention.
Figure 2:
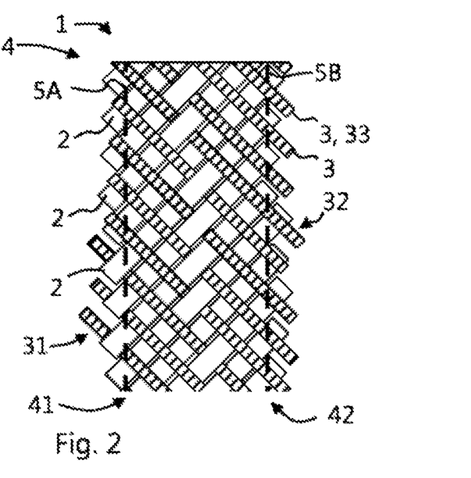
FIG. 2 a top view of a semi-finished product according to a further exemplary embodiment of the present invention.
Figure 16:
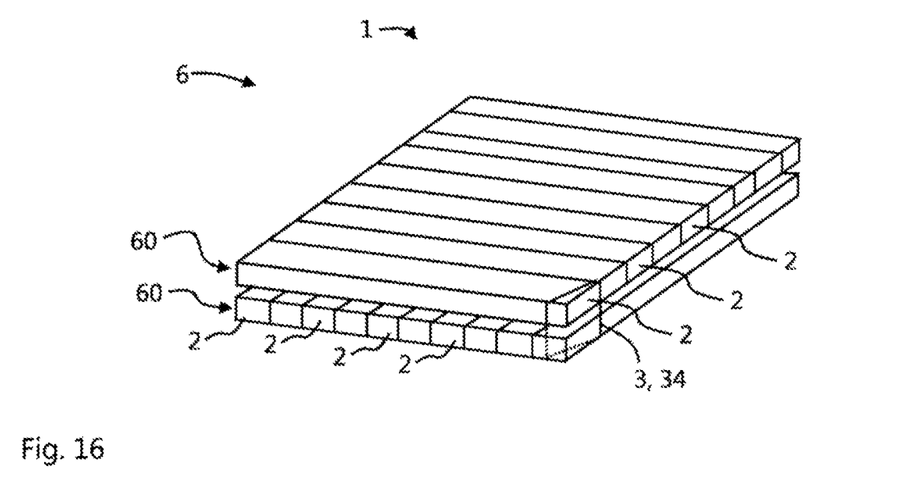
FIG. 16 a schematic partial sectional view of a semi-finished product according to a further exemplary embodiment of the present invention.

FIGS. 1, 2 and 16 each show a semi-finished product 1 for manufacturing a structural component B. As shown in FIGS. 1, 2 and 16, the semi-finished product comprises a plurality of prepreg tapes 2 and a plurality of connecting strands 3.

Figure 3:
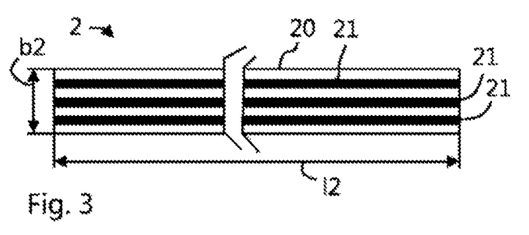
FIG. 3 a schematic sectional view of a prepreg tape of a semi-finished product according to an exemplary embodiment of the present invention.

FIG. 3 shows, by way of example, of a schematic, interrupted sectional view of a prepreg tape 2. As can be seen in FIG. 3, the prepreg tape 2 comprises several reinforcing fibers 21 extending in one direction or unidirectionally. The reinforcing fibers 21 may, for example, be in the form of fiber bundles. As further shown in FIG. 3, the reinforcing fibers 21 are embedded in a thermoplastic matrix material 20. As shown in particular in FIGS. 1, 2 and 16, the prepreg tapes 2 are realized as narrow, strip-shaped tapes. As shown in FIG. 3, the prepreg tapes 2 may have a width b2, e.g., in a range between 1 mm and 15 mm, and a length l2, e.g., in a range between 0.5 m and 100 m.

Figure 4:
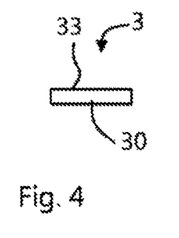
FIG. 4 a schematic sectional view of a connecting strand of a semi-finished product according to an exemplary embodiment of the present invention.
Figure 5:
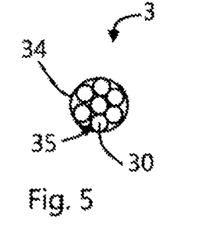
FIG. 5 a schematic sectional view of a connecting strand of a semi-finished product according to a further exemplary embodiment of the present invention.

FIGS. 4 and 5 show, by way of example, possible designs of the connecting strands 3. In particular, the connecting strands 3 can each be made of a thermoplastic material or comprise a thermoplastic material. In FIG. 4, an example of a reinforcing strand 3 is shown in cross-section, which is realized as a foil tape 33 consisting of thermoplastic material 30. As exemplified in FIG. 4, the foil tape 33 may be realized with a rectangular cross-section. FIG. 5 shows an example of a reinforcing strand 3 in cross-section, which is formed as a thread 34 consisting of thermoplastic material 30. As schematically and exemplarily shown in FIG. 5, the thread 34 may be formed of a plurality of twisted filaments 35 forming an approximately circular cross-section of the thread 34. Optionally, the reinforcing strands 3 contain the same thermoplastic material used as the matrix material of the prepreg tapes.

In the semi-finished product 1 shown in FIG. 1 by way of example, the prepreg tapes 2 and the connecting strands 3 are interwoven with each other and thereby form a textile, single-layer sheet structure 4. As exemplarily shown in FIG. 1, the connecting strands 3 run transversely to the prepreg tapes 2, each of the connecting strands 3 crossing several of the prepreg tapes 2. In particular, each connecting strand 3 runs in sections on opposite sides of the prepreg tapes 2. The prepreg tapes 2 run along each other and do not cross each other within the sheet structure 4. In FIG. 1 the connecting strands 3 are exemplarily shown as foil tapes 33.

As can be seen in FIG. 1, the prepreg tapes 2 extend in a first direction R1 and the connecting strands 3 extend in a second direction R2 transverse to the first direction R1. In order to prevent fraying of the fabric, in FIG. 1 an outermost first prepreg tape 2A and an outermost second prepreg tape 2B, which is located opposite to the first prepreg tape, are connected by way of a material joint to the connecting strands 3 with respect to the second direction R2. As exemplarily shown in FIG. 1, the connecting strands 3 are connected in a material joint to the first prepreg tape 2A in the region of a first end portion 31 and to the second prepreg tape 2A in the region of a second end portion 32, which is located opposite to the first end portion 31 with respect to the second direction R2. The first and second prepreg tapes 2A, 2B define respective opposite edges of the textile sheet structure 4. As exemplified in FIG. 1, in particular each of the connecting strands 3 may be materially joined to the first and second prepreg tapes 2A, 2B. Generally, the connecting strands 3 and the prepreg tapes 2 are materially joined to each other in a first end region 41 of the sheet structure 4 and in a second end region 42 of the sheet structure 4 opposite to the first end region 41, in each case along a respective connecting line 5A, 5B. In FIG. 1, the connecting lines 5A, 5B each run along the first direction R1 or along the first and second prepreg tapes 2A, 2B. The material joint may be created by ultrasonic welding, for example.

As further shown in FIG. 1, it may be provided that the first end region 31 of the connecting strands 3 protrudes or projects beyond the first prepreg tape 2A and the second end region 32 of the connecting strands 3 protrudes or projects beyond the second prepreg tape 2B with respect to the second direction R2, thereby forming a projecting tab. Generally, it may be provided that the end regions 31, 32 of the connecting strands 3 project beyond the connecting lines 5A, 5B, respectively.

In the semi-finished product 1 shown by way of example in FIG. 2, the prepreg tapes 2 and the connecting strands 3 are interwoven with each other and thus form a textile, single-layer sheet structure 4. As schematically shown in FIG. 2, the connecting strands 3 run transversely to the prepreg tapes 2, each of the connecting strands 3 crossing several of the prepreg tapes 2. In particular, each connecting strand 3 runs in sections on opposite sides of the prepreg tapes 2. In FIG. 2, the connecting strands 3 are exemplarily shown as foil tapes 33.

As exemplarily shown in FIG. 2, the connecting strands 3 are each materially joined to one of the prepreg tapes 2 in the region of a first end portion 31 and in the region of a second end portion 32, which is located opposite to the first end portion 31 with respect to the second direction R2. As a result, the connecting strands 3 and the prepreg tapes 2 are materially joined to one another in a first end region 41 of the sheet structure 4 and in a second end region 42 of the sheet structure 4, which is located opposite to the first end region 41, in each case along a respective connecting line 5A, 5B. In FIG. 2, it is shown by way of example that the connecting lines 5A, 5B each run along intersections of the prepreg tapes 2 and the connecting strands 3 and obliquely to a longitudinal extent of the prepreg tapes 2 and the connecting strands 3. The material joint can be created by ultrasonic welding, for example.

As further shown in FIG. 2, it may be provided that one or more of the connecting strands 3 have the first end portion 31 projecting beyond the first connecting line 5A and the second end portion 32 projecting beyond the second connecting line 5B to form a projecting tab.

The semi-finished products 3 shown in FIGS. 1, 2 allow the prepreg tapes to slide against each other due to their textile structure, which reduces the risk of wrinkles forming when the semi-finished product is deformed.

The semi-finished product 1 shown schematically and as an example in FIG. 16 has a multi-layer structure. The prepreg tapes 2 are arranged to form a flat, multi-axial fabric 6, which comprises several superimposed layers 60 of prepreg tapes 2. As shown schematically in FIG. 16, the prepreg tapes 2 extend parallel to each other within a respective layer 60. In adjacent layers 60, the prepreg tapes 2 extend in different directions, e.g., transversely to each other. In FIG. 16, only two plies or layers 60 are shown for simplicity. The individual layers 60 are sewn or otherwise connected, e.g. welded, knitted, entangled or linked, relative to each other at individual, preferably discrete, e.g. periodically repeating points or spots. For reasons of clarity, this is only shown at a single point in FIG. 16. As shown by way of example, for connecting the individual layers 60 a connecting strand 3 can be used. In this case, the connecting strand 3 wraps around two intersecting prepreg tapes 2 at a crossing point, for example. The connecting strand 3 is preferably formed as a thread 34.

In the semi-finished product 1 shown by way of example in FIG. 16, the prepreg tapes 2 within a layer 60 and the layers 60 can slide against each other, thus reducing the risk of wrinkling during forming of the semi-finished product 1.

Figure 17:
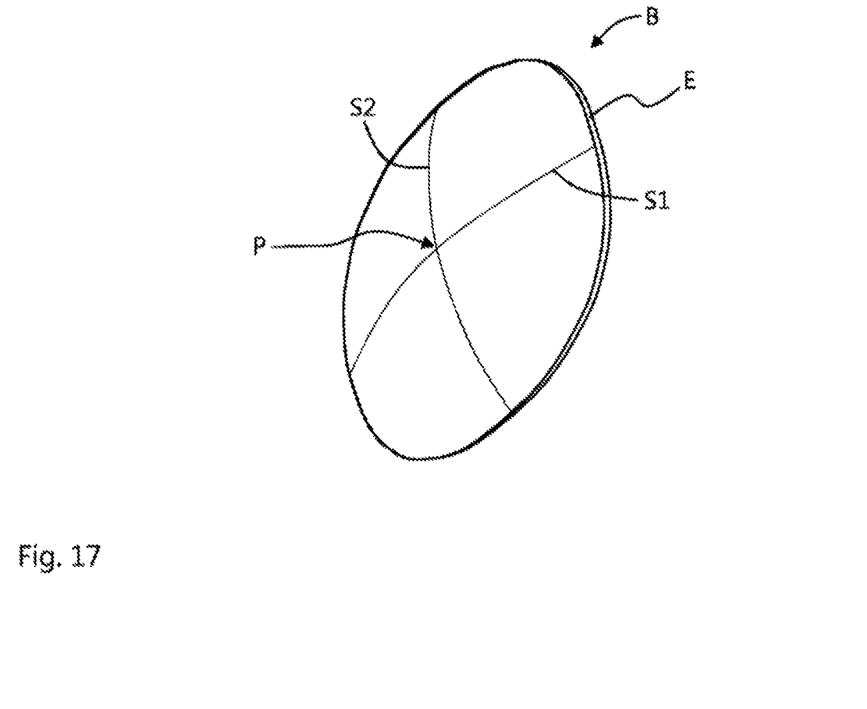
FIG. 17 a structural component manufactured by means of a method according to an exemplary embodiment of the present invention.

In the following, with respect to FIGS. 6 to 15, a method for manufacturing a curved structural component B, e.g., a structural component B as exemplarily shown in FIG. 17, is explained.

FIG. 17 shows an example of a curved structural component B in the form of a pressure dome for an aircraft (not shown). The structural component B may in particular have a circular peripheral edge E. As shown in FIG. 17, the structural component may, for example, be dome-shaped or cupola-shaped and thus be curved in several curvature directions. In FIG. 17, a vertex P of the curved shape of the structural component B is drawn in, which is given by an intersection of symmetry lines S1, S2 of the structural component B.

For production of the structural component B, a layered structure 100 is first formed which has a plurality of superimposed layers 110, the layers 110 each containing at least one semi-finished product 1, as described by way of example with reference to FIGS. 1, 2 and 16.

Figure 6:
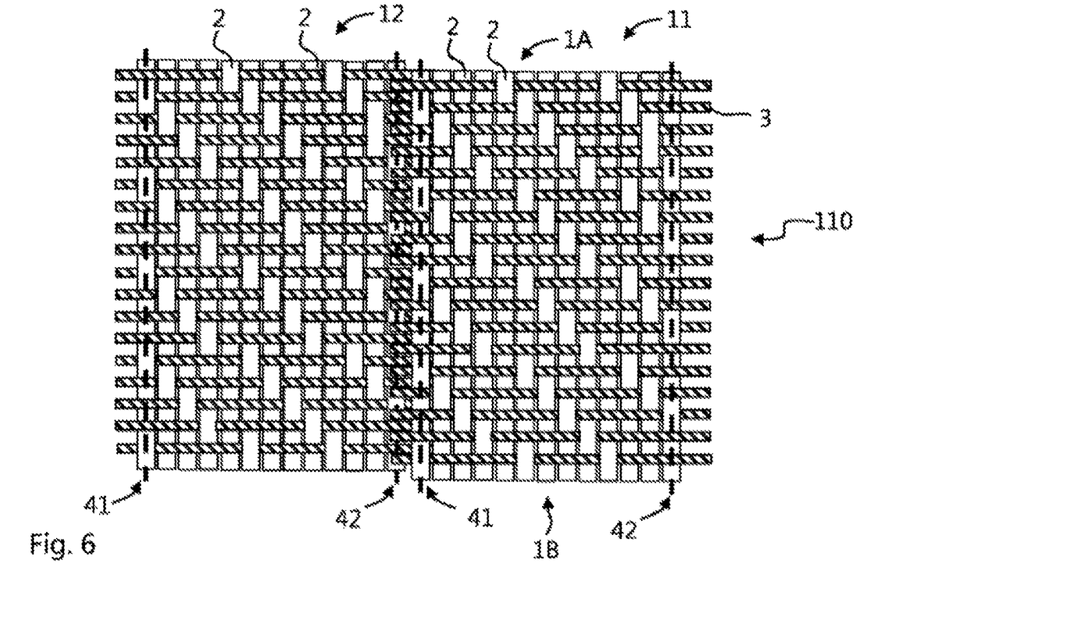
FIG. 6 a top view of a layer for producing a layered structure, wherein the layer is formed from two semi-finished products as shown in FIG. 1.
Figure 7:
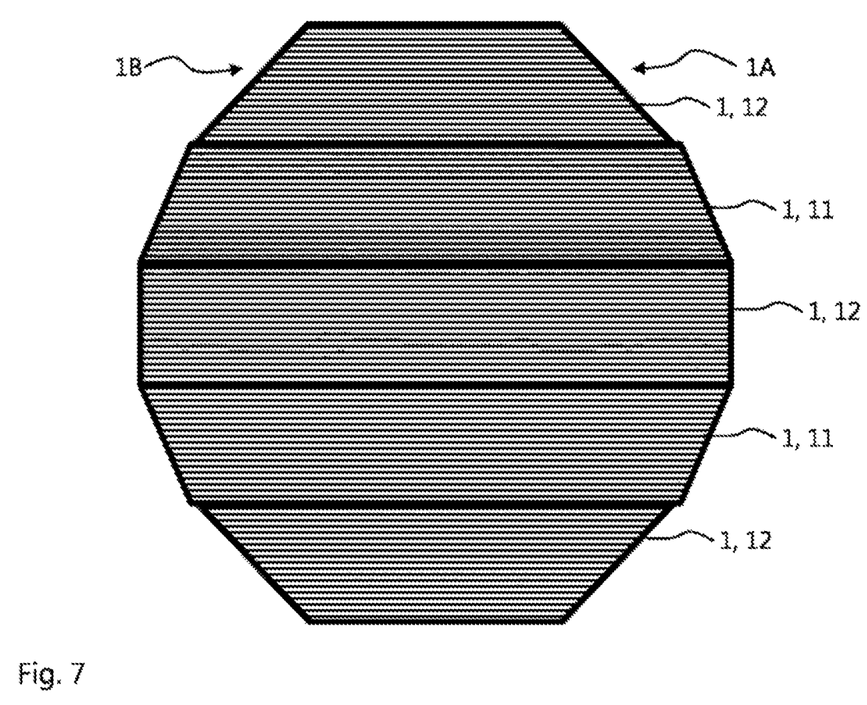
FIG. 7 a top view of a layer for producing a layered structure, which is formed from several cut-to-size semi-finished products according to an exemplary embodiment of the present invention.
Figure 8:
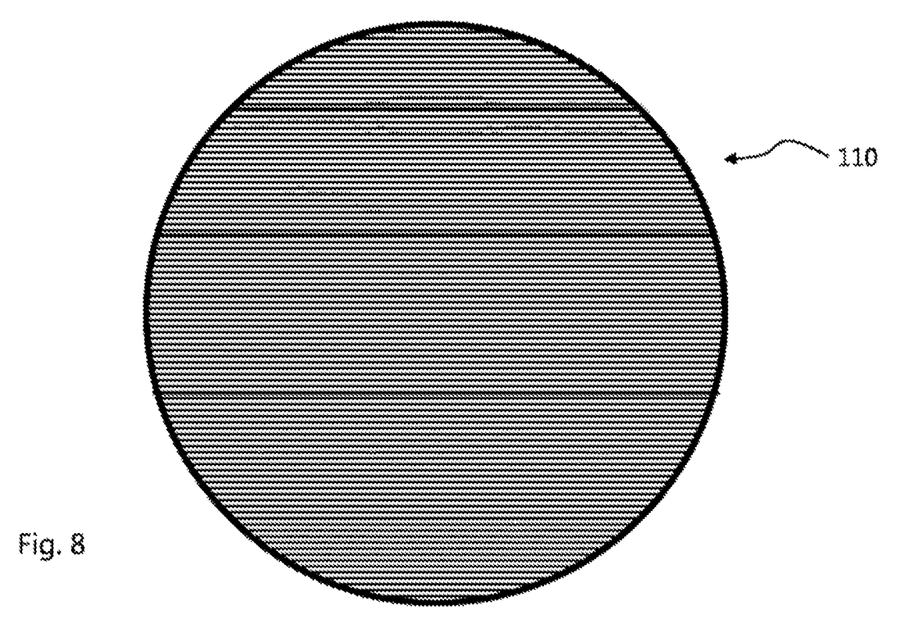
FIG. 8 a top view of the layer in FIG. 7 after cutting-to-size.

The layers 110 are realized as flatly extending mats. FIGS. 6 to 8 exemplarily show the production of a single layer 110 from several of the semi-finished products 1 shown in FIG. 1. For forming of the layer 110, first end sections 31 of the connecting strands 3 of a first semi-finished product 11 are first thermoplastically or materially joined to prepreg tapes 2 of a respective further semi-finished product 12, e.g. by ultrasonic welding. The second end sections 32 of the connecting strands 3 of the further semi-finished product 12 are further thermoplastically joined to prepreg tapes 2 of the first semi-finished product 11, for example also by ultrasonic welding. As shown in FIG. 6, the first end portions 31 of the connecting strands 3 of the first semi-finished product 11 overlap the outermost second prepreg tape 2B of the second semi-finished product 12 and the second end portions 32 of the connecting strands 3 of the first semi-finished product 12 overlap the outermost first prepreg tape 2A of the first semi-finished product 11.

The semi-finished product 1 shown in FIG. 2 can be connected to other such semi-finished products 1 in the same way.

FIG. 7 shows a layer 110 formed by several semi-finished products 1 as described above. The individual semi-finished products 1 were trimmed at opposite ends 1A, 1B before being joined to form a layer 110. In this way, different circumferential shapes of the layers 110 can be produced, e.g., an approximately circular circumference, as shown by way of example in FIG. 7. Optionally, the layer 110 formed by the semi-finished products 1 can also be cut further in order to set the exactly desired circumferential shape of the layer 110, e.g. circular, as shown in FIG. 8.

Of course, it is also conceivable to form a layer 110 from one respective semi-finished product 1.

When using semi-finished products 1 formed as multi-axial fabrics, as exemplified in FIG. 16, one layer 110 of the layered structure 100 contains several layers 60 of the semi-finished product 1.

Figure 9:
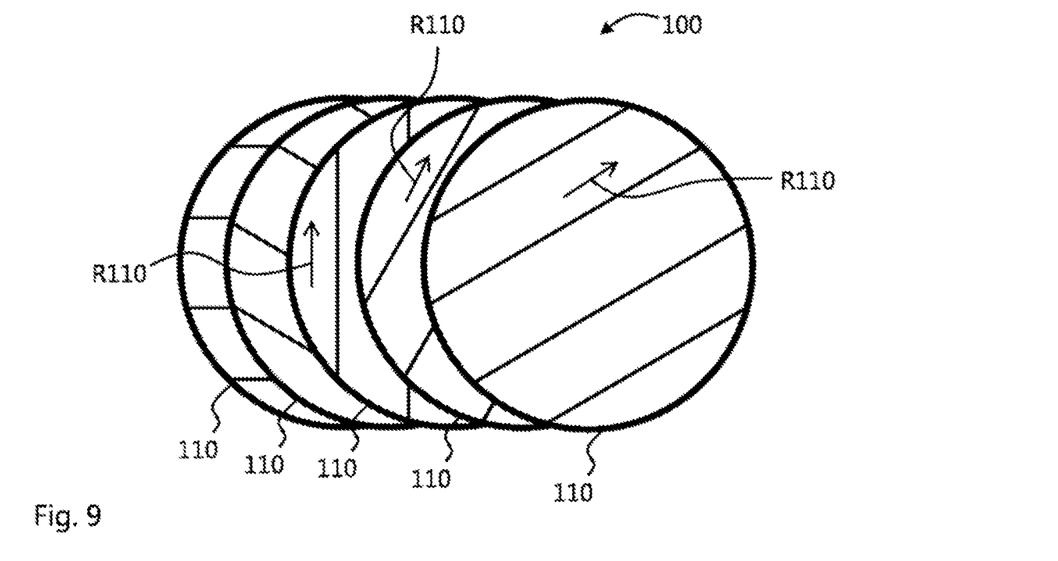
FIG. 9 a schematic exploded view of a layered structure consisting of several layers.

The layered structure 100 is generally formed by stacking or placing several layers 110 on top of each other, as exemplified in an exploded view in FIG. 9. As shown schematically in FIG. 9, the layered structure 100 can in particular be formed in such a way that the prepreg tapes 2 in different layers 110 extend in different directions R110. In particular, it can be provided that the prepreg tapes 2 of adjacent layers 110 of the layered structure 100 extend in intersecting directions R110.

Figure 11:
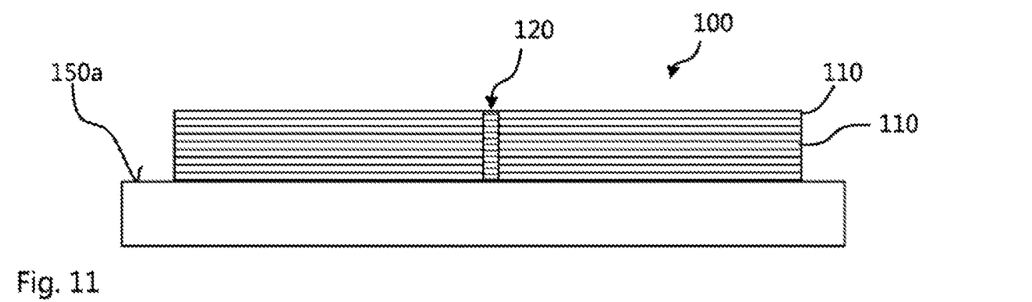
FIG. 11 a schematic sectional view of a layered structure of multiple layers that has been produced on a flat deposition surface in a step of a method according to an exemplary embodiment of the present invention on a flat deposition surface.
Figure 12:
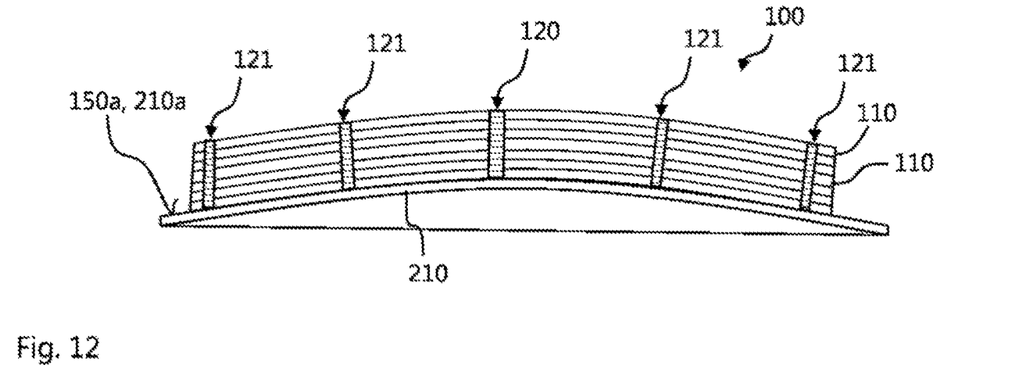
FIG. 12 a schematic sectional view of a layered structure of multiple layers that has been produced on a curved deposition surface in a step of a method according to an exemplary embodiment of the present invention.

As exemplified in FIG. 11, the layered structure 100 can be formed, for example, by sequentially stacking the layers 110 on a flat deposition surface 150a. Alternatively, the layered structure 100 can also be formed by stacking the layers 110 on a curved deposition surface 150a, as shown schematically in FIG. 12. In the latter case, due to the shape unstable nature of the textile sheet structure 4 or the multi-axial fabric 6, the individual layers 110 are at least partially deformed in accordance with the curved support surface 150a. The curved deposition surface 150a can be provided, for example, by a contour surface 210a of a forming tool 200 corresponding to the curved shape of the structural component B. The forming tool 200 will be explained in detail below.

Figure 10:
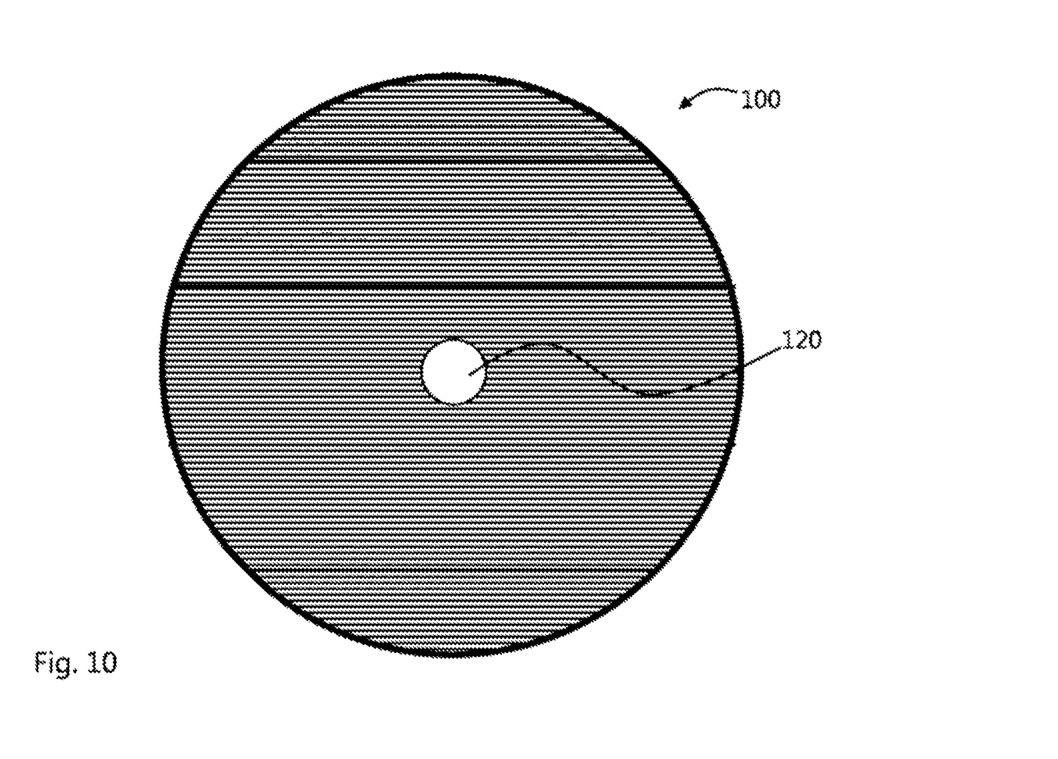
FIG. 10 a top view of a layered structure of multiple layers after the creation of an optional joint position in a step of a method according to an exemplary embodiment of the present invention.

After formation of the layered structure 100, the layers 110 are optionally thermoplastically joined, e.g., by ultrasonic welding, at a joining point 120, which is located, for example, in the region of the apex P of the curved shape to be produced. Generally, the joining position is selected in such a way that no or only very little displacement of the layers 110 relative to each other is necessary in the corresponding area during subsequent deformation. If the layers 110 have been placed on a curved deposition surface 150a, an additional thermoplastic joining is optionally carried out at further joining points 121 away from the apex point P, e.g., also by ultrasonic welding. FIG. 10 shows a schematic top view of a layered structure 100, which is formed from layers 110 with a circular circumference. The joint 120 is formed in the region of the center with respect to a radial direction. This is the region that forms the apex P of the structural component B shown as an example in FIG. 17.

In a further step, forming the layered structure 100 into the curved shape occurs. This forming step is performed at a forming temperature that is lower than a melting point of the thermoplastic materials 20, 30 of the semi-finished product 1. The forming temperature is thus lower than a melting point of the matrix material 20 of the prepreg tapes 2 and lower than a melting point of the thermoplastic material 30 of the connecting strands 3. As a result, the prepreg tapes 2 and the reinforcing strands 3 of the semi-finished products 1 contained in the layers 110 are in a solid aggregate state, which reduces friction or viscous adhesion between and within the layers 110. In addition, during the forming process, the reinforcing fibers within the individual prepreg tapes are still supported by solid matrix material, so that the fibers are better protected from buckling even in the event of a compressive load in the longitudinal direction of the fibers due to the forming process. This prevents the formation of wrinkles, waviness or ondulations in the fiber layers during forming.

Figure 13:
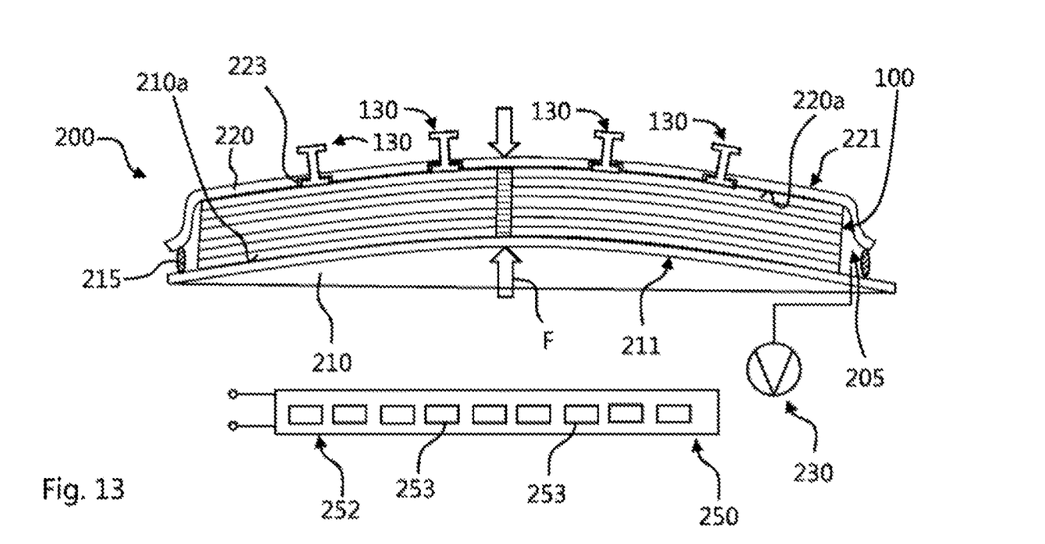
FIG. 13 a forming and heating of a layered structure in a cavity of a forming tool in steps of a method according to an exemplary embodiment of the present invention.

The forming can take place, for example, in a cavity 205 of a forming tool 200, as shown schematically in FIG. 13. The forming tool 200 comprises a form part 210 having a contour surface 210a corresponding to the curved shape of the structural component B, and an abutment member 220. The abutment member 220 and the form part portion 210 are positionable relative to each other in a closed position, as exemplified in FIG. 13. In the closed position, a cavity 205 is formed between the contour surface 210a and an inner surface 220a of the abutment member 220. Optionally, a seal 215 may be disposed between the abutment member 220 and the form part 210 to hermetically seal the cavity 205 in the closed position of the forming tool 200.

As exemplarily shown in FIG. 13, the form part 210 can be formed as a flatly extending first form plate 211 and the abutment member 220 can be formed as a flatly extending second form plate 221. The inner surface 220a of the abutment member 220 can be designed to correspond to the shape of the structural component B to be produced or to be complementary to the contour surface 210a of the form part 210.

Figure 15:
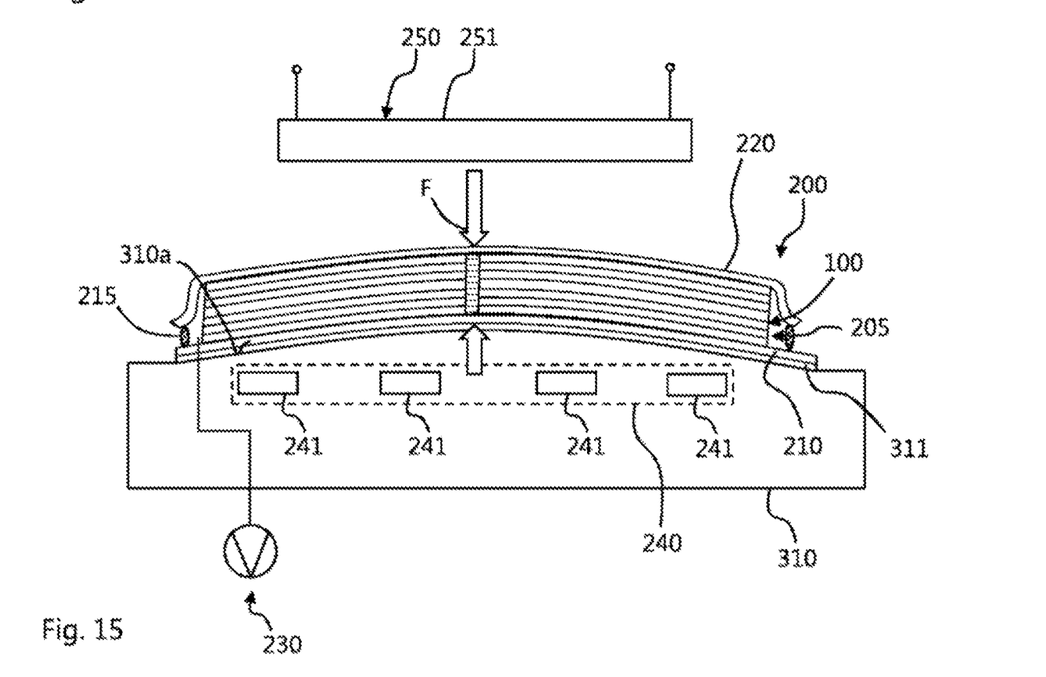
FIG. 15 a forming, heating and consolidating of a layered structure in a cavity of a forming tool in steps of a method according to an embodiment example of the present invention.

For forming the layered structure 100 formed on the flat deposition surface 150a (FIG. 11) or to further form the already partially formed layered structure 100 created on the curved deposition surface 150a (FIG. 12), a force F is applied to the form part 210 and the abutment member 220 such that the layered structure 100 is pressed together between the form part 210 and the abutment member 220. The force F may be applied, for example, by creating a vacuum in the cavity 205 of the forming tool 200 by means of an evacuation device or pump 230 fluidically coupled to the cavity 205, as exemplified in FIG. 13. This simultaneously ensures that any air pockets that may be present in the layered structure 100 are removed or reduced. Alternatively, or in addition thereto, the force F may also be generated by generating a magnetic field which is coupled into a magnetizable material associated with the first form plate 211 and/or into a magnetizable material associated with the second form plate 221 such that the layered structure is subjected to the compression pressure by the form plates. For example, it may be provided that the first and/or the second form plates 211, 221 and/or a substructure, such as the form half 310 is formed of a magnetizable metal material and a magnetic field is generated which pulls or compresses the first and the second form plates 211, 221 relative to each other. This is exemplified in FIG. 15. Accordingly, the magnetizable material is associated with the form plates 211, 221 in that they are themselves formed from a magnetizable material or contain a magnetizable material. The magnetizable material may also be associated with the first form plate 211 in that the form half 310 is formed from or comprises a magnetizable material. A magnet device 240 comprising a plurality of electric induction coils 241 distributed along the contour surface 210a of the form part 210 may be provided to generate the magnetic field. Permanent magnets (not shown) may also be provided instead of electric induction coils 241. In general, the magnet device 240 may comprise magnetic field generators arranged to generate a magnetic field. In the following, reference is made by way of example to induction coils 241 as magnetic field generators, whereby the features disclosed in this regard also apply in an analogous manner to other magnetic field generators. The magnet device 240 can be located in the lower structure of the form half 310, as shown in FIG. 15, or for example also on the other side, above the upper form plate 221. In the latter case in particular, the magnet device 240 may comprise an at least partially flexible or articulated support structure which is coupled to the second form plate 221 so that the induction elements 241 are flexibly connected to one another and can adapt to the form plate 221 in order to transmit the pressure as uniformly as possible. In particular, the magnet device 240 is arranged to generate a magnetic field directed transversely to the contour surface 210a.

FIG. 13 also shows the result of a further optional method step in which reinforcing profiles 130 were applied to a layer 110 of the layered structure 100 opposite to the contour surface 210a. The reinforcing profiles 130 may, for example, have a double T-shaped cross-section, as schematically shown in FIG. 13, and also comprise a thermoplastic plastic material. For example, the reinforcing profiles 130 may be formed from a fiber reinforced thermoplastic material. The forming tool 200 is then moved to the closed position, as shown in FIG. 13. In this case, the abutment member 220 or the second form plate 221 is provided with recesses 223 through which a girder of the reinforcement profile 223 extends. For this purpose, the second form plate 221 can, for example, be formed in two parts, a first part having the recesses 223 in the form of slots which are open on one side and are closed by a second part. Alternatively, the stiffening profiles 130 can also be inserted into enveloping bulges or recesses (not shown) of the second form plate 221 or of the abutment member 220. This improves tightness of the cavity 205. The stiffening profile 130 in general may be pressed against the layered structure 100 in the cavity 205 by means of the abutment member 220.

In a further step, the formed layered structure 100 is heated to a temperature that is higher than the melting point of the thermoplastic materials 20, 30 of the semi-finished product 1. This melts the thermoplastic matrix material 20 of the prepreg tapes 2 and the thermoplastic material 30 of the connecting strands 3, whereby the individual layers 110 of the layered structure 100 fuse together and are thereby joined. The optional stiffening profiles 130 are thereby also fused to the uppermost layer 110.

Preferably, the heating takes place in the cavity 205 of the forming tool 200. Optionally, a vacuum is also generated in the cavity 205 by means of the pump 205. A heating device 250 can be provided for heating the cavity 205. In FIG. 13, the heating device 250 is exemplarily designed as an induction heating device 252, which comprises one or more induction coils 253 to induce an alternating magnetic field in at least one of the form plates 211, 221, which inductively heats the form plate 211, 221 so that the cavity 205 is heated. In FIG. 13, the heating device 250 is located on the side of the form part 210 as an example. In the example of FIG. 13, this preferably excites the first form plate 211, so that the layered structure 100 heats up starting from the latter and the optional stiffening profiles 130 are heated predominantly in the region in which they are in contact with the layered structure 100.

In FIG. 15, the heating device 250 is exemplarily designed as an infrared radiator 251, which is arranged on the side of the abutment member 220. Optionally, another infrared radiator (not shown) may be arranged on the side of the form part 210. In general, the infrared radiator 251 is arranged to generate thermal radiation in order to heat the cavity 205. Of course, an induction heating device 252 may also be provided in FIG. 15, as explained with reference to FIG. 13. Furthermore, it is conceivable that the magnet device 240, which is provided per se for applying the compression pressure, is also used as a heating device. For this purpose, it can be provided that a direct current flows through the induction coils 241 to generate the magnetic direct field for applying the compression pressure and an alternating electric current flows through the induction coils 241 to heat the cavity 205.

Optionally, and independently of the design of the heating device 250 or the heat supply for heating, the forming tool 200 may be deposited on a form half 310 during heating, as exemplified in FIG. 15. The form half 310 may have a form surface 310a, which may be shaped to correspond to a rear surface 210b of the form part 210 of the forming tool 200. Advantageously, an insulating layer 311 is arranged between the form surface 310a of the form half 310 and the rear surface 210b of the form part 210 in order to avoid heating of the form half 310 to the greatest possible extent. This has the advantage that the form half 310 is exposed to smaller temperature fluctuations and consequently deforms less strongly due to thermal expansion. In particular, the form half 310 serves as a support for the forming tool 200. This allows the form plates 211, 221 to be made relatively thin. This speeds up the heating of the cavity 205 and reduces tool costs. As further shown in FIG. 15, the magnet device 240 may be integrated into the form half 310, for example.

In a further method step, consolidating of the layered structure 100 occurs by applying a compression pressure and cooling to a solidification temperature that is lower than the melting point of the thermoplastic materials 20, 30 of the semi-finished product 1. During consolidation, the layered structure 100 cools down or heat is dissipated from the layered structure. As a result, the thermoplastic material 20, 30 solidifies and the structural component B is formed.

Consolidation can also take place in the cavity 205 of the forming tool 200. For cooling, the heating device 250 is switched off and/or the forming tool 205 and the heating device 250 are physically separated from each other. As exemplarily shown in FIG. 15, the consolidation or cooling can also take place on the form half 310. In this case, the compression pressure can be generated by the vacuum device 205 and/or by the magnet device 240. Generally, the compression pressure 200 can be applied by the forming tool 200.

Figure 14:
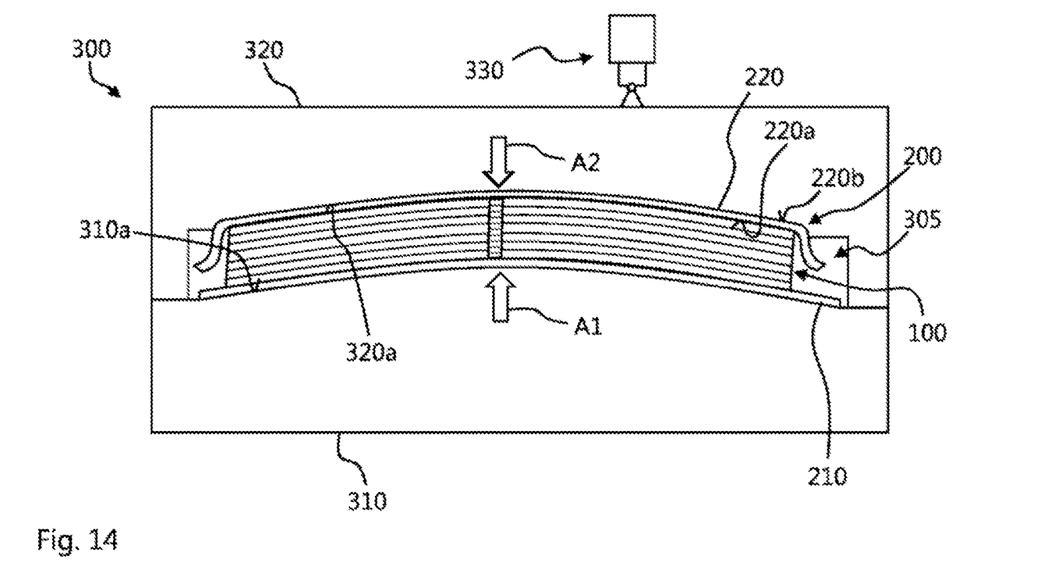
FIG. 14 a consolidation of a layered structure received in a cavity of a forming tool in a cavity of a pressing tool in a step of a method according to an exemplary embodiment of the present invention.

Alternatively, the forming tool 200 can be arranged in a cavity 305 formed by two form halves 310, 320 of a pressing tool 300 for consolidation or cooling, and the compression pressure can be applied through the form half 310, 320, as schematically shown in FIG. 14. The exemplary pressing tool 300 shown in FIG. 14 comprises a first form half 310 and a second form half 320. The first form half 310 can be formed with a first form surface 310a analogous to the form half described with reference to FIG. 15. The second form surface 320 comprises a second form surface 320a which is formed to correspond to an outer surface 220b of the abutment member 220. The form halves 310, 320 are movable relative to each other between an open position and a closed position by means of a movement device 330, for example in the form of a hydraulic drive. FIG. 14 shows the pressing tool 300 in a closed position or stance in which the second form surface 320a faces the first form surface 310a and the form halves 310, 320 or the form surfaces 310a, 320a of the form halves 310, 320 define the cavity 305.

As schematically indicated by arrows A1, A2 in FIG. 14, the form halves 310, 320 press the form part 210 and the abutment member 220 and thus the layered structure 100, which is located in the cavity 205 of the forming tool 200, together. Thus, the compression pressure is applied by the pressing tool 300. Optionally, during consolidation or cooling, the cavity 305 of the pressing tool 300 and/or the cavity 205 of the forming tool 200 may be evacuated. Optionally, if the layered structure 100 is heated together with the form plates 211 and 221 outside the pressing tool, the cavity 205 of the forming tool 200 may already be evacuated before being placed in the cavity 305 of the pressing tool 300, which facilitates the holding together of the layered structure 100 and the form plates 211, 221 and removes air previously present in the layered structure 100 even before melting.

During consolidation or cooling of the layered structure 100, the form halves 310, 320 have a temperature that is lower than the melting temperature of the thermoplastic materials 20, 30. As a result, the form halves 310, 320 form heat sinks, which accelerates the cooling of the cavity 205. The cooling may be further accelerated in that the form halves 310, 320 are formed of a metal material having a high thermal conductivity, such as aluminum or the like. Advantageously, the heat capacity of the form halves 310, 320 is many times, for example ten times, the heat capacity of the form plates 211, 212 of the forming tool 200.

Although the present invention has been explained above with reference to example embodiments, it is not limited to these, but can be modified in a variety of ways. In particular, combinations of the above embodiments are also conceivable.

REFERENCE LIST

1 semi-finished product
1A, 1B endings of the semi-finished product
2 prepreg tapes
2A first prepreg tape
2B second prepreg tape
3 connecting strands
4 sheet structure
5A, 5B connecting lines
6 multiaxial fabric
11 first semi-finished product
12 second semi-finished product
20 thermoplastic matrix material
21 reinforcing fibers
30 thermoplastic plastic material
31 first end section of the connecting strands
32 second end section of the connecting strands
33 foil tape
34 Thread
35 filaments
41 First end region of the sheet structure
42 second end region of the sheet structure
60 layers
100 layered structure
110 layer
120 joining point
130 reinforcing profiles
150a deposition surface
200 forming tool
205 cavity of the forming tool
210 form part
211 first form plate
210a contour surface of the form part
210b back surface of the form part
215 seal
220 abutment member
220a inner surface of the abutment member
221 second form plate
230 pump
240 magnet device
250 heating device
251 infrared radiator
252 induction heating device
300 pressing tool
305 cavity of the pressing tool
310 first form half
310a form surface of the first form half
320 second form half
320a form surface of the second form half
330 movement device
B structural component
b2 width of the prepreg tapes
E peripheral edge of the structural component
F force
l2 length of the prepreg tapes
P apex
R1 first direction
R2 second direction
S1, S2 symmetry lines
R110 direction

The invention claimed is:

1. A semi-finished product for manufacturing of a structural component, comprising:
a plurality of prepreg tapes extending along each other, each having unidirectionally arranged reinforcing fibers embedded in a thermoplastic matrix material; and
a plurality of connecting strands comprising a thermoplastic material;
wherein the connecting strands and the prepreg tapes are connected to form a single-layer textile sheet structure in which each of the connecting strands crosses a plurality of the prepreg tapes; and
wherein the connecting strands and the prepreg tapes are joined to one another along respective connecting lines by way of a material joint in a first end region of the sheet structure and in a second end region of the sheet structure positioned opposite to the first end region.

2. The semi-finished product of claim 1, wherein the prepreg tapes extend in a first direction (R1) and the connecting strands extend in a second direction (R2) running transversely to the first direction (R1), and wherein an, in relation to the second direction (R2), outermost first prepreg tape and an outermost second prepreg tape located opposite to the first prepreg tape are each joined to the connecting strands by way of a material joint to form the connecting lines.

3. The semi-finished product of claim 1, wherein the prepreg tapes and the connecting strands are interwoven or twined with each other.

4. The semi-finished product of claim 1, wherein the connecting strands each have a first end portion and a second end portion located opposite to the first end portion, the first and second end portions each projecting beyond the connecting lines.

5. A semi-finished product for manufacturing of a structural component, comprising:
- a plurality of prepreg tapes each having unidirectionally arranged reinforcing fibers embedded in a thermoplastic matrix material;
- wherein the prepreg tapes are arranged in a multiaxial fabric comprising several superimposed layers of prepreg tapes;
- wherein the prepreg tapes run parallel to each other within a layer;
- wherein the layers are joined relative to each other on single positions, by a plurality of connecting strands containing a thermoplastic material, and
- wherein the connecting strands are formed as foil tapes having the thermoplastic material.

6. A method of manufacturing a structural component having a curved shape, comprising the following method steps:
- forming a layered structure from a plurality of layers, wherein the layers each comprise at least one semi-finished product according to claim 1;
- forming the layered structure into the curved shape at a forming temperature lower than a melting point of the thermoplastic materials of the semi-finished product;
- heating the formed layered structure to a temperature greater than the melting point of the thermoplastic materials of the semi-finished product; and
- cooling the layered structure to a solidification temperature lower than the melting point of the thermoplastic materials of the semi-finished product while applying a compression pressure.

7. The method of claim 6, wherein the individual layers of the layered structure are each formed from a plurality of semi-finished products according to claim 4, in which at least the first end sections of the connecting strands of a first semi-finished product are thermoplastically joined to prepreg tapes of a respective further semi-finished product, wherein the second end sections of the connecting strands of the further semi-finished product are thermoplastically joined to prepreg tapes of the first semi-finished product.

8. The method of claim 6, wherein the layered structure is formed such that the prepreg tapes in different layers extend in different directions.

9. The method of claim 6, wherein the layered structure is formed by sequentially stacking the layers on a planar deposition surface and the forming is performed in a cavity of a forming tool, the cavity formed by a form part having a contour surface corresponding to the curved shape of the structural component and a flat abutment member.

10. The method of claim 6, wherein the layered structure is formed by sequentially stacking the layers on a curved deposition surface and thereby simultaneously formed into the curved shape, wherein the deposition surface is a contour surface of a form part of a forming tool formed to correspond to the curved shape of the structural component, the forming tool additionally having a flat abutment member for forming a cavity with the form part.

11. The method of claim 9, wherein the heating of the layered structure takes place in the cavity of the forming tool.

12. The method of claim 9, wherein the form part of the forming tool is formed as a flatly extending first form plate, and wherein the abutment member is formed as a flatly extending second form plate.

13. The method of claim 12, wherein, in order to apply the compression pressure, a magnetic field is generated by means of a magnet device, wherein the magnetic field is coupled into a magnetizable material associated with the first form plate and/or into a magnetizable material associated with the second form plate in such a way that the layered structure is subjected to the compression pressure by the form plates, and wherein the first and/or the second form plates are formed from a magnetizable metal material.

14. The method of claim 9, wherein the forming tool is deposited on a form half for heating and cooling, and wherein the compression pressure is applied by the forming tool during cooling.

15. The method of claim 9, wherein the forming tool is arranged in a cavity formed by two form halves of a pressing tool for cooling and the compression pressure is applied through the form halves.

16. The method according to claim 12, wherein the heating of the layered structure is carried out by inductive heating of the form plates or by infrared radiation.

17. The method of claim 9, wherein a vacuum is created in the cavity of the forming tool.

* * * * *